(12) United States Patent
Nikonov et al.

(10) Patent No.: US 9,304,491 B2
(45) Date of Patent: Apr. 5, 2016

(54) TRANSPARENT HOLOGRAPHIC DISPLAY WITH DYNAMIC IMAGE CONTROL

(71) Applicant: Intel Corporation, Santa Clara, CA (US)

(72) Inventors: Dmitri E. Nikonov, Beaverton, OR (US); Michael C. Mayberry, Beaverton, OR (US); Vivek K. Singh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 13/685,401

(22) Filed: Nov. 26, 2012

(65) Prior Publication Data

US 2014/0146133 A1    May 29, 2014

(51) Int. Cl.
*H04N 13/04*  (2006.01)
*G03H 1/22*   (2006.01)

(52) U.S. Cl.
CPC ..... *G03H 1/2294* (2013.01); *G03H 2001/2234* (2013.01); *G03H 2210/30* (2013.01)

(58) Field of Classification Search
CPC ..... G03H 1/2294; G03H 1/08; G03H 1/2286; G02B 27/22; G02B 27/46
See application file for complete search history.

(56) References Cited

U.S. PATENT DOCUMENTS

| | | | | |
|---|---|---|---|---|
| 5,629,782 A * | 5/1997 | Ichimura et al. | | 359/9 |
| 5,767,993 A * | 6/1998 | Burney | | 359/32 |
| 5,986,780 A * | 11/1999 | Sudo et al. | | 359/22 |
| 5,986,781 A * | 11/1999 | Long | | 359/30 |
| 6,020,090 A * | 2/2000 | Takada et al. | | 430/1 |
| 6,127,066 A * | 10/2000 | Ueda et al. | | 430/1 |
| 2001/0028482 A1 * | 10/2001 | Nishioka | | 359/15 |
| 2002/0154349 A1 * | 10/2002 | Halldorsson et al. | | 359/15 |
| 2007/0211319 A1 * | 9/2007 | Tomida | | 359/3 |
| 2007/0297750 A1 * | 12/2007 | Bass et al. | | 385/147 |
| 2011/0249275 A1 * | 10/2011 | Lal et al. | | 356/622 |
| 2012/0019883 A1 * | 1/2012 | Chae et al. | | 359/11 |
| 2012/0050830 A1 * | 3/2012 | Yoon et al. | | 359/11 |
| 2012/0212523 A1 * | 8/2012 | Yamauchi | | 345/697 |
| 2014/0111609 A1 * | 4/2014 | Yamaichi | | 348/40 |
| 2014/0132998 A1 * | 5/2014 | Yamaichi | | 359/9 |

OTHER PUBLICATIONS

Bjelkhagen, H. I., "Colour Holography: The Ultimate 3D Imaging Technique", The Imaging Science Journal, vol. 59., 7 pages.
Gray, "Apple Patents 3D Holographic Display", Dec. 27, 2010, downloaded from http://coyoteprime-runningcauseicantfly.blogspot.com/2010/12/technology-apple-patents-3d-holographic.html.

(Continued)

*Primary Examiner* — Victor Kostak
(74) *Attorney, Agent, or Firm* — Grossman, Tucker, Perreault & Pfleger, PLLC

(57) ABSTRACT

Generally, this disclosure provides systems and methods for generating three dimensional holographic images on a transparent display screen with dynamic image control. The system may include a transparent display screen that includes an array of pixels; a driver circuit configured to control each of the pixels in the array of pixels such that the transparent display screen displays an interference fringe pattern, the interference fringe pattern associated with a hologram; and a coherent light source configured to illuminate the transparent display screen with coherent light, wherein transformation of the coherent light by the interference fringe pattern generates a three dimensional holographic image.

26 Claims, 9 Drawing Sheets

(56) References Cited

OTHER PUBLICATIONS

Holographic Screen, downloaded from http://en.wikipedia.org/wiki/Holographic_screen.

Ackerman, Microsoft's New Holographic Display Breaks Out from Behind Glass, Jan. 6, 2012, downloaded from http://dvice.com/archives/2012/01/microsofts-new-1.php.

* cited by examiner

US 9,304,491 B2

TRANSPARENT HOLOGRAPHIC DISPLAY WITH DYNAMIC IMAGE CONTROL

FIELD

The present disclosure relates to transparent holographic displays, and more particularly, to transparent holographic display screens with dynamic image control.

BACKGROUND

Video displays are commonly provided on many devices including, for example, computer workstations, laptops and mobile platforms. These displays typically present visual information in a two dimensional (2D) format. Three dimensional (3D) video displays are desirable, however, since they would provide a sense of realism, depth perception and visual information from varying viewing angles. The quality and satisfaction of the user presentation experience may thus be improved if 3D displays were provided.

There are a number of existing simulated 3D display systems in current use. Stereoscopic glasses, for example, may be worn by the viewer to provide separate and slightly offset images to each eye to simulate a 3D effect. Other systems employ micro-lenses in a display screen to create the illusion of a hologram by shifting the visible position of images away from the plane of the screen. Still other systems use parabolic mirrors to create the illusion of an object hovering in space. These techniques generally provide non-realistic images, however, and do not permit the viewer (or multiple viewers) to visualize an object from multiple angles as would be possible with a true hologram.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, methods and platforms for generating three dimensional holographic images on a transparent display screen with dynamic image control. A holographic interference fringe pattern, associated with a hologram, may be reconstructed from stored features of the fringe pattern. A driver circuit may control an array of pixels in the transparent display screen to duplicate the interference fringe pattern on the screen while a coherent light source illuminates the transparent display screen. The coherent light may be transformed, for example varied in phase or transmittance, by the interference fringe pattern to generate a 3D holographic image.

The stored fringe pattern features, from which the interference fringe pattern is reconstructed, may include data on the period and direction of segments of the pattern stripes that make up the interference fringe pattern. The coherent light source, for example a laser, may share similar characteristics, such as wavelength and bandwidth, with the laser that was used to capture the hologram (interference fringe pattern) of the object or scene being imaged.

The driver circuit may dynamically update the interference fringe pattern, for example over multiple frames, to create a 3D holographic motion video.

Figure 1:
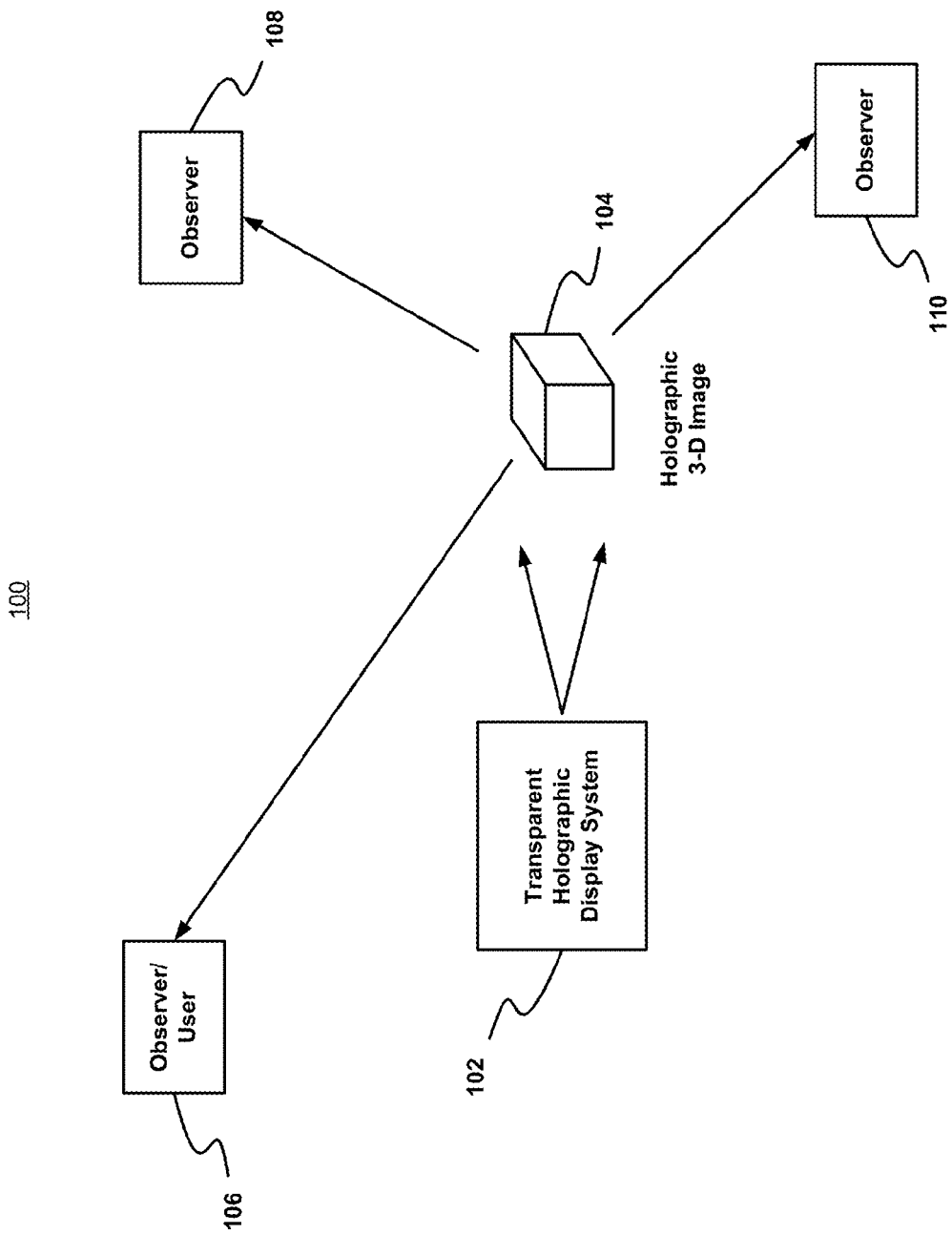
FIG. 1 illustrates a top level system diagram of one exemplary embodiment consistent with the present disclosure.

FIG. 1 illustrates a top level system diagram 100 of one exemplary embodiment consistent with the present disclosure. A transparent holographic display system 102 is shown to create a holographic 3-D image 104 that may be visualized by observers 106, 108, 110 from multiple viewing angles. One of the observers 106 may be a user or operator of the transparent holographic display system 102, the operation of which will be described in greater detail below. In some embodiments, the transparent holographic display system 102 may be part of a platform such as, for example, a mobile communication device, tablet or laptop.

Figure 2:
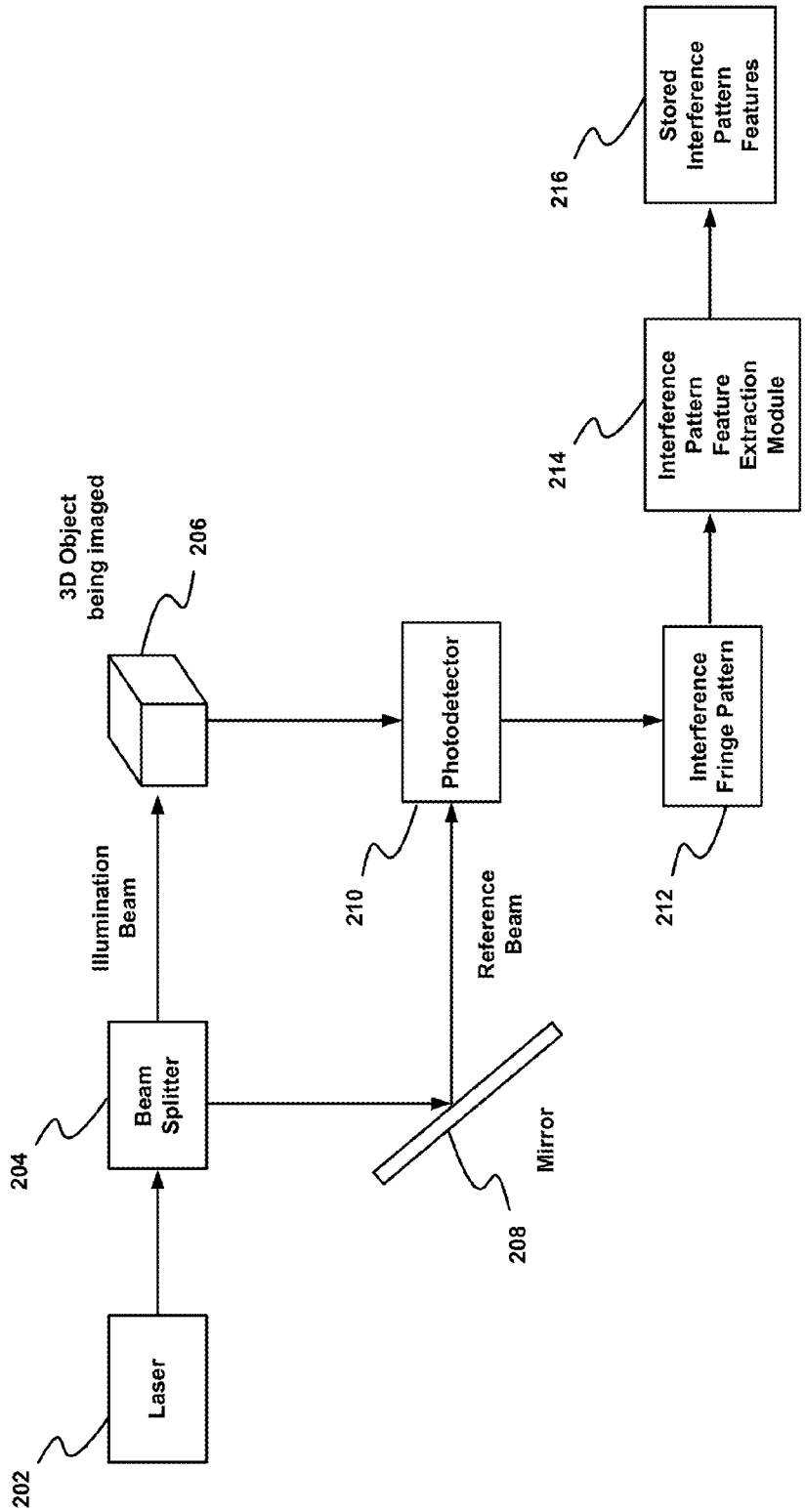
FIG. 2 illustrates a block diagram of one exemplary embodiment consistent with the present disclosure.

FIG. 2 illustrates a block diagram 200 of one exemplary embodiment consistent with the present disclosure. This system illustrates one approach to generating a 3-D hologram and the associated interference pattern features, the usage of which will be explained in greater detail below. A laser or other coherent light source 202 is configured to generate coherent light, (e.g., a laser beam) at a suitable wavelength. The wavelength may be in the range of visible light for example, the range being approximately 400 nm to 750 nm. The laser beam may be split by beam splitter 204 to produce an illumination beam and a reference beam. The illumination beam illuminates the 3-D object to be imaged 206. Some portion of the illumination beam is reflected or scattered off object 206 and directed toward photo detector 210. The reference beam, which may be reflected off mirror 208 is also directed toward photo detector 210. The superposition of the illumination beam and the reference beam at the photo detector 210 generates an interference fringe pattern 212 which provides a representation of the 3-D image of object 206. Interference pattern feature extraction module 214 is configured to extract features of the interference fringe pattern, as will be described in greater detail below. These features may be sufficient to characterize the fringe pattern and may be used for later reconstruction of the fringe pattern. These features, which consume less bandwidth and/or memory than the actual fringe pattern, may be stored, for example in any suitable type of memory 216.

In an alternative embodiment, an interference fringe pattern may be generated by a computer system to achieve any desired 3-D image. This approach may advantageously enable the creation of a 3-D image without relying on the existence of a particular physical object or scene to be imaged. Interference pattern features may then be extracted from the computer generated interference fringe pattern and stored as subsequent use in image reconstruction. In some embodiments, the interference pattern features may be directly generated by the computer, eliminating the need to generate the underlying interference fringe pattern.

Figure 3:
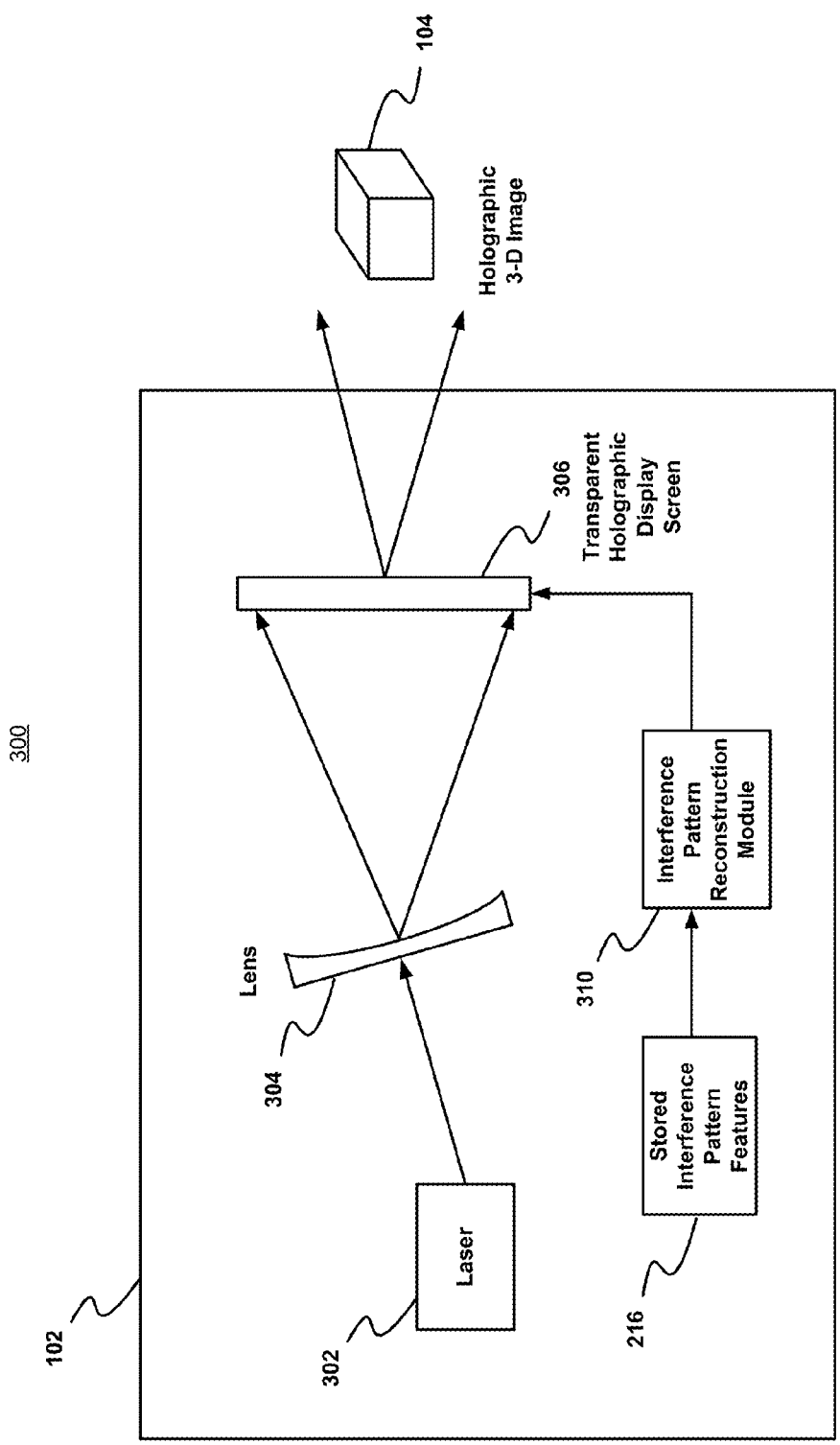
FIG. 3 illustrates a block diagram of another exemplary embodiment consistent with the present disclosure.

FIG. 3 illustrates a block diagram 300 of another exemplary embodiment consistent with the present disclosure. Transparent holographic display system 102 is shown to include a laser or other coherent light source 302, a lens 304 a transparent holographic display screen 306, storage for interference pattern features 216 and an interference pattern reconstruction module 310. The laser 302 may be configured to provide coherent light at a wavelength that is substantially the same as the light provided by source 202 used to generate the hologram as described above. Lens 304, (e.g., a diverging lens) may be configured to spread the coherent light source so that it illuminates a desired area of the transparent holographic display screen 306.

Interference pattern reconstruction module 310 may be configured to reconstruct the interference fringe pattern associated with the holographic image to be generated. The reconstruction may be based on the stored interference pattern features 216. The reconstructed fringe pattern is provided to driver circuits in the transparent holographic display screen 306 to control the optical characteristics of pixels in the display, as will be explained below. The reconstructed fringe pattern which is displayed on the screen 306 transforms the coherent light by varying the transmittance and/or the phase of the light. The resulting transformed light generates a 3-D holographic image 104 corresponding to the object that was imaged 206.

Figure 4:
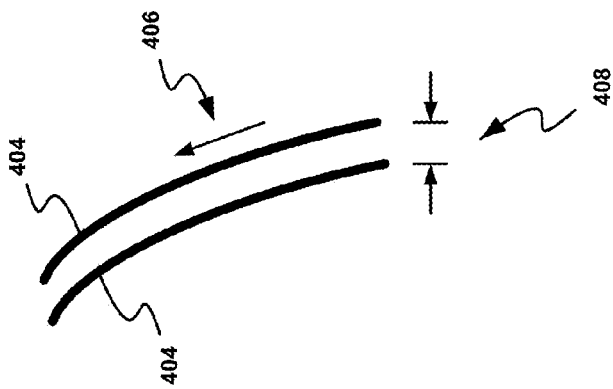
FIG. 4 illustrates an exemplary interference fringe pattern and associated features consistent with the present disclosure.
Figure 4:
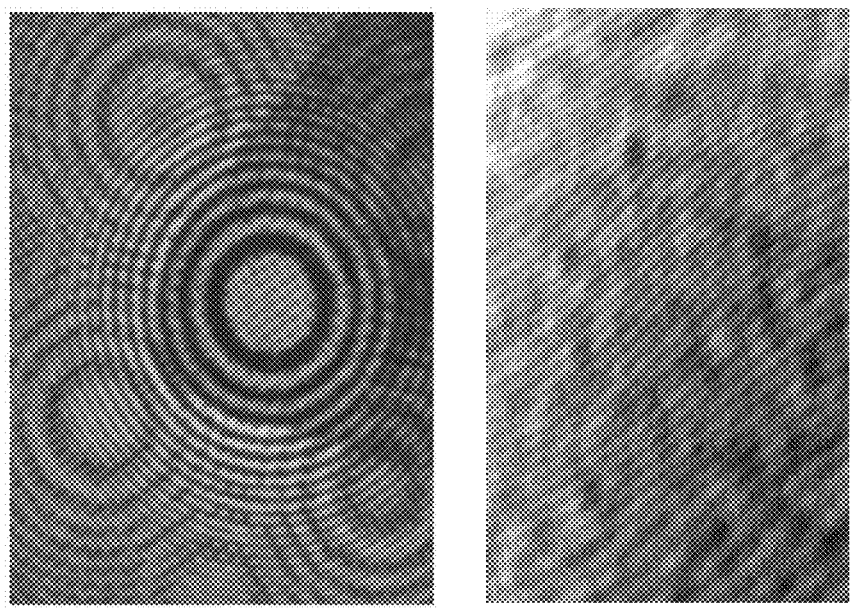

FIG. 4 illustrates an exemplary interference fringe pattern and associated features consistent 400 with the present disclosure. Example interference fringe patterns 212 are shown. Holographic interference fringe patterns are generally composed of a large number of oscillating stripes. An approximation of the fringe pattern may be represented, however, by estimating the direction 406 and period 408 of segments of the stripes 404 over a number of regions of the pattern. The density of the estimation regions, for example, the number of regions and area or spatial extent of the regions, may be selected and adjusted to achieve a desired image quality. In some embodiments, the density of the estimation regions may vary over different areas of the fringe pattern depending on the characteristics of the stripes (e.g., the rate of change) in that area. The direction 406 and period 408 of segments of stripes in multiple areas of the fringe pattern make up the fringe pattern features 216 which may be stored and transmitted more efficiently than the actual fringe pattern.

Figure 5:
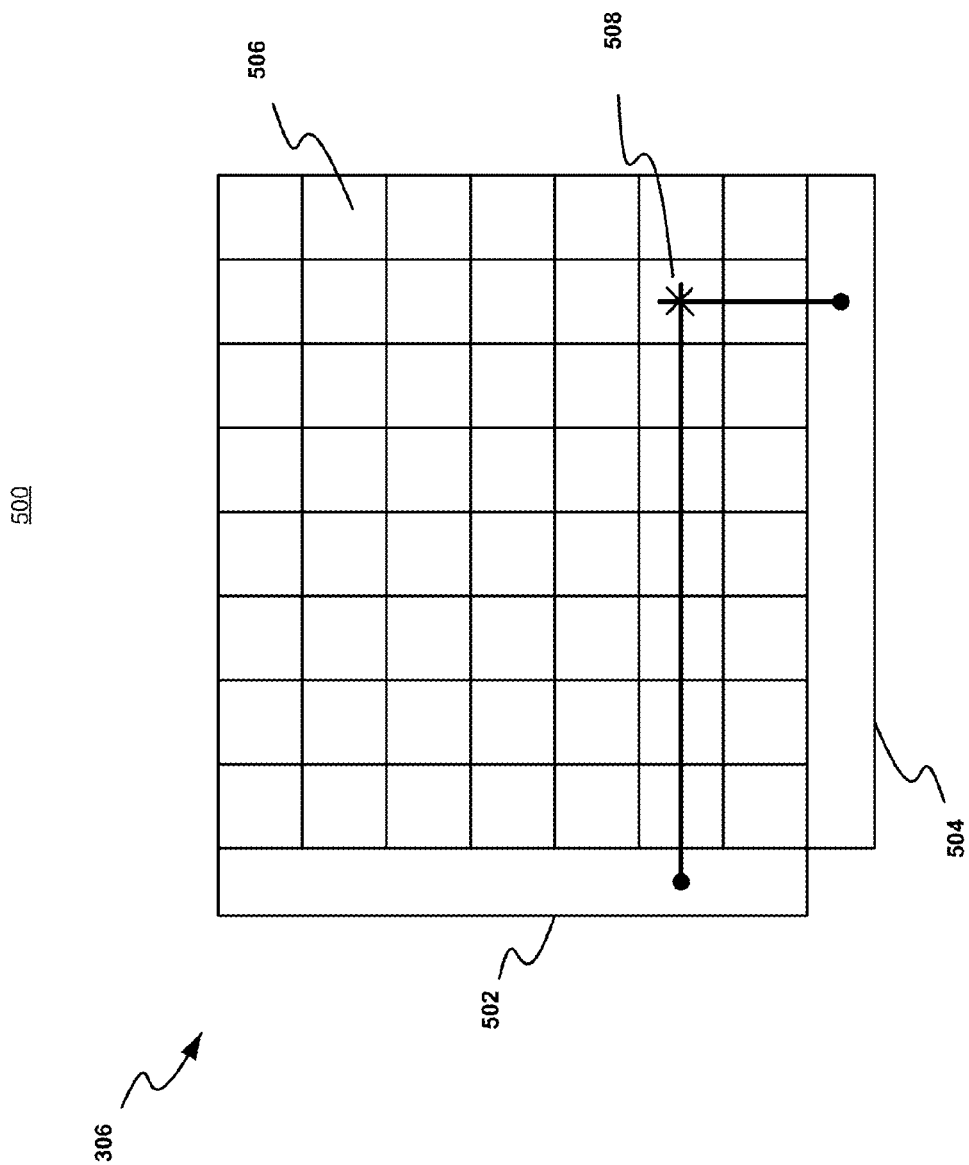
FIG. 5 illustrates a front view of an exemplary embodiment consistent with the present disclosure.

FIG. 5 illustrates a front view 500 of an exemplary embodiment consistent with the present disclosure. Transparent holographic display screen 306 is shown to include an array of pixels 506, and driver circuits 502, 504 configured to control the optical characteristics of the pixels to display the reconstructed fringe pattern. In some embodiments, driver circuit 502 may be configured to control pixels in a horizontal row of the display 306 by the application of a voltage signal to electrodes associated with the pixels in that row. In a similar manner, driver circuit 504 may be configured to control pixels in a vertical column of the display 306 by the application of a voltage signal to electrodes associated with the pixels in that column. Any pixel in the array of pixels may be addressed in this way to control the state of that pixel. The pixels may be sized to be comparable to the wavelength of visible light (i.e., 400 nm to 750 nm). Thus a 5 cm by 5 cm screen may include 100,000 by 100,000 pixels. The representation of interference pattern features, as in shown in FIG. 4—406 and 408, however, eliminates the need to transmit information associated with each individual pixel. Instead, the pixel information is reconstructed from the period 408 and direction 406 of stripes 404.

Figure 6:
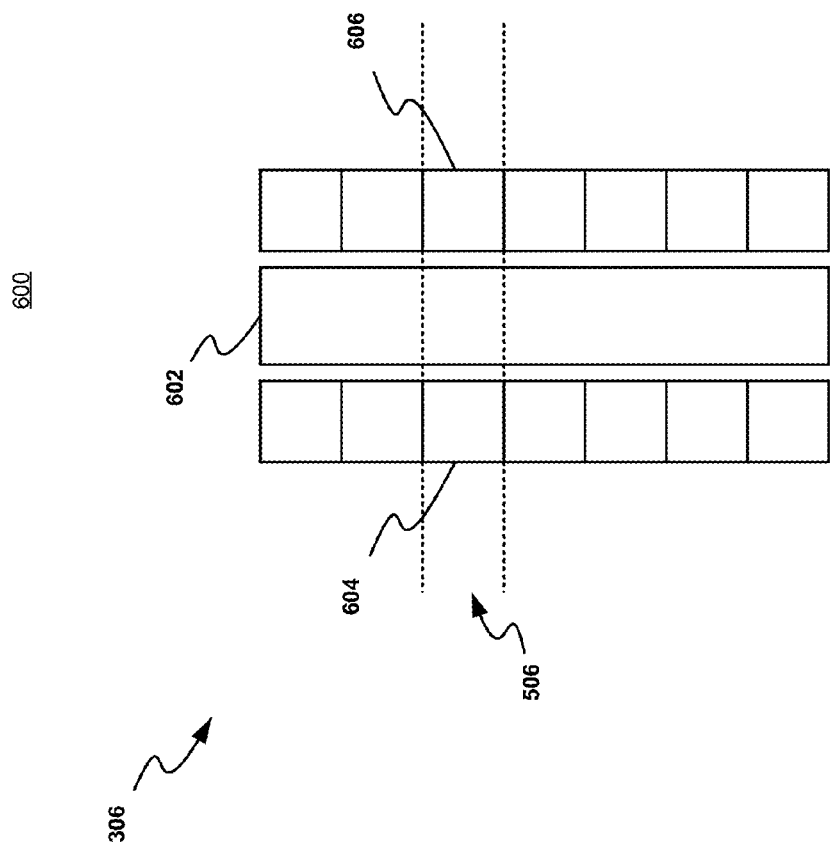
FIG. 6 illustrates a side view of an exemplary embodiment consistent with the present disclosure.

FIG. 6 illustrates a side view 600 of an exemplary embodiment consistent with the present disclosure. Transparent holographic display screen 306 is shown, from the side, to include a front layer of electrodes 604 and a rear layer of electrodes 606. Each of the front and rear electrodes may be associated with a pixel 506 to be controlled through the application of a voltage signal to the electrodes. In some embodiments, the electrodes may be fabricated from a transparent conducting crystal, such as, for example Indium Tin Oxide (ITO). In alternative embodiments, the electrodes may be fabricated from graphene, a material formed by a number of single-atom layers of carbon that is thin enough to be transparent while retaining a high current carrying capacity. In some embodiments, the number of single-atom layers may be in the range of 1 to 10 layers.

An interior film layer 602 is positioned between the front layer of electrodes and the rear layer of electrodes. In some embodiments, particularly where the interference fringe patterns represent variations in the transmittance of the coherent illumination, the interior layer may be a liquid crystal. In this case the controlling voltage from the electrodes affects the transmittance properties of the film in the region of the electrodes in a manner similar to that of an LCD display. In some embodiments, particularly where the interference fringe patterns represent variations in the phase of the coherent illumination, the interior layer material may be $LiNbO_3$ or $BaB_2O_4$. In this case the controlling voltage from the electrodes affects the phase altering properties of the film material in accordance with the known Pockels effect.

Figure 7:
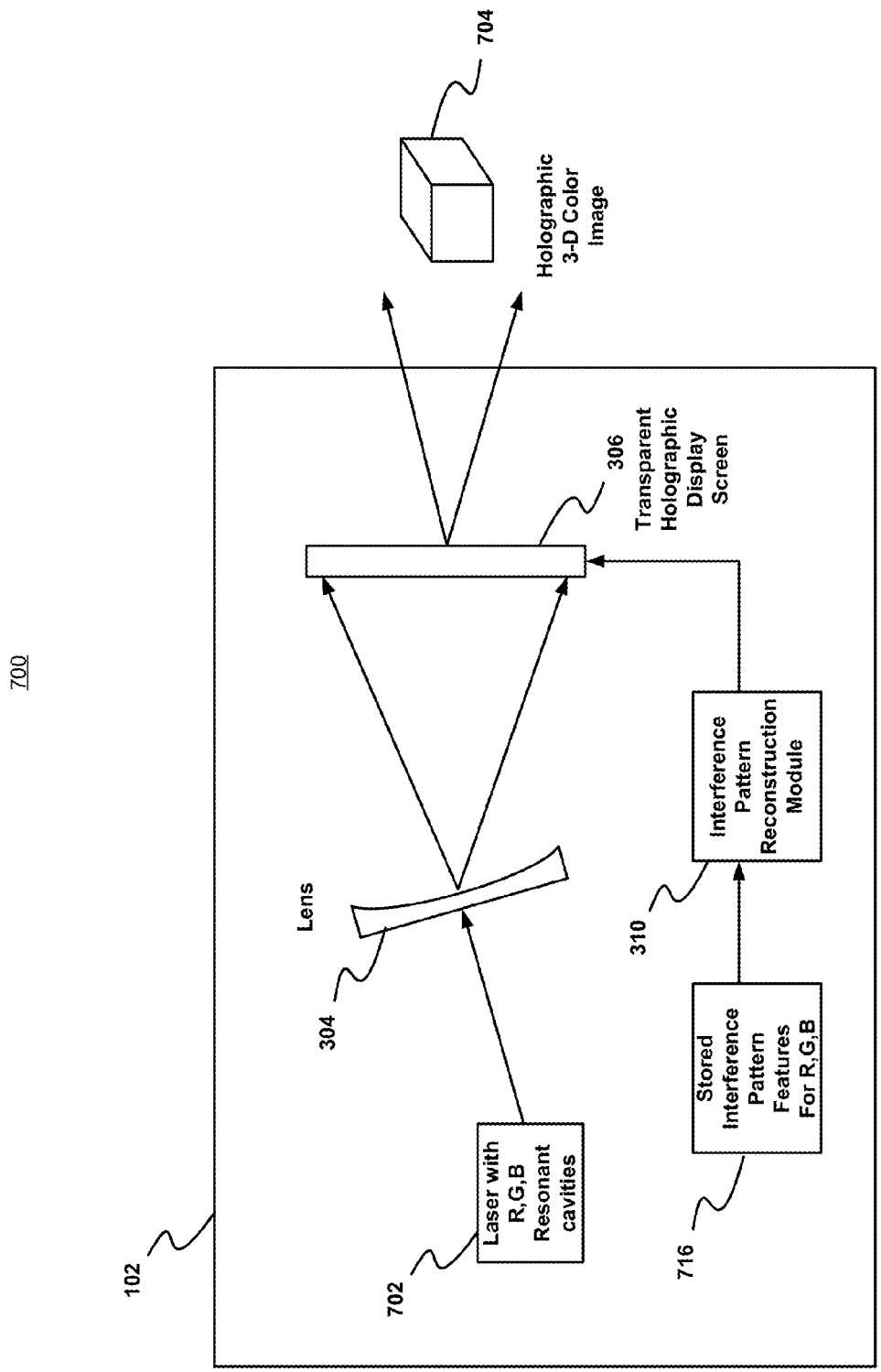
FIG. 7 illustrates a block diagram of another exemplary embodiment consistent with the present disclosure.

FIG. 7 illustrates a block diagram 700 of another exemplary embodiment consistent with the present disclosure. The system in FIG. 7 is similar to the system shown in FIG. 3, with the addition of color holographic imaging capability. Transparent color holographic display system 102 is shown to include a laser 702 configured with red, green and blue (RGB) resonant cavities. The laser 702 may have the capability to simultaneously generate RGB coherent light. The system further includes a lens 304, a transparent holographic display screen 306, storage for RGB interference pattern features 716 and an interference pattern reconstruction module 310. The laser 702 may be configured to provide coherent light in the RGB regions at wavelengths that are substantially the same as the RGB wavelengths of light provided by the coherent source (not shown) used to generate the RGB hologram. Lens 304, (e.g., a diverging lens) may be configured to spread the RGB coherent light so that it illuminates a desired area of the transparent holographic display screen 306.

Interference pattern reconstruction module 310 may be configured to reconstruct the RGB interference fringe patterns associated with the color holographic image to be generated. The reconstruction may be based on the stored RGB interference pattern features 716. The reconstructed fringe pattern is provided to driver circuits in the transparent holographic display screen 306 to control the optical characteristics of pixels in the display, as described above. The reconstructed fringe pattern which is displayed on the screen 306 transforms the coherent RGB light by varying the transmittance and/or the phase of the light. The resulting transformed light generates a 3-D holographic image 104 corresponding to the object that was imaged 206.

Figure 8:
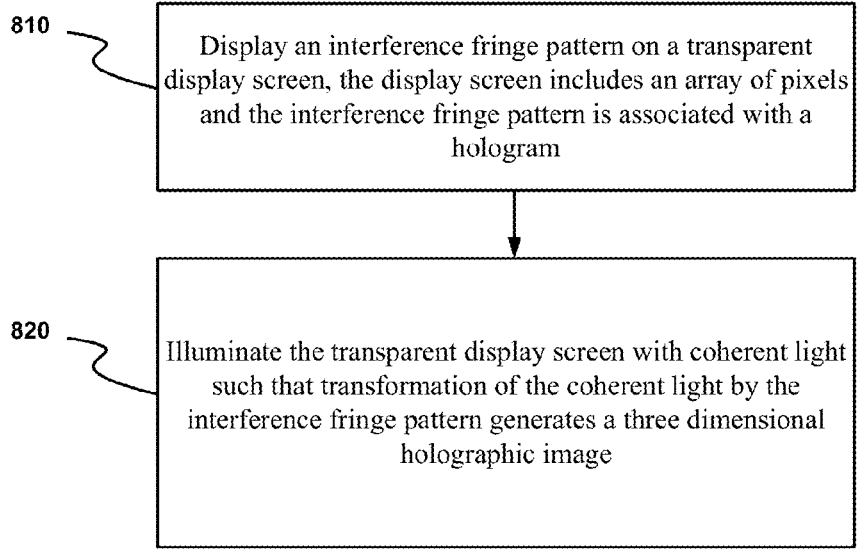
FIG. 8 illustrates a flowchart of operations of another exemplary embodiment consistent with the present disclosure.

FIG. 8 illustrates a flowchart of operations 800 of an exemplary embodiment consistent with the present disclosure. At operation 810, an interference fringe pattern is displayed on a transparent display. The display screen includes an array of pixels and the interference fringe pattern is associated with a hologram. At operation 820, the transparent display screen is illuminated with coherent light such that transformation of the coherent light by the interference fringe pattern generates a three dimensional holographic image. The interference fringe pattern may be generated based on interference pattern features including the period and direction of interference pattern stripes.

Although the exemplary embodiments described above have disclosed the generation of a single holographic image, it will be appreciated that multiple such images may be generated and that the multiple images may correspond to a time sequence of images that create a 3-D motion video (e.g., a 3-D movie, etc.).

Figure 9:
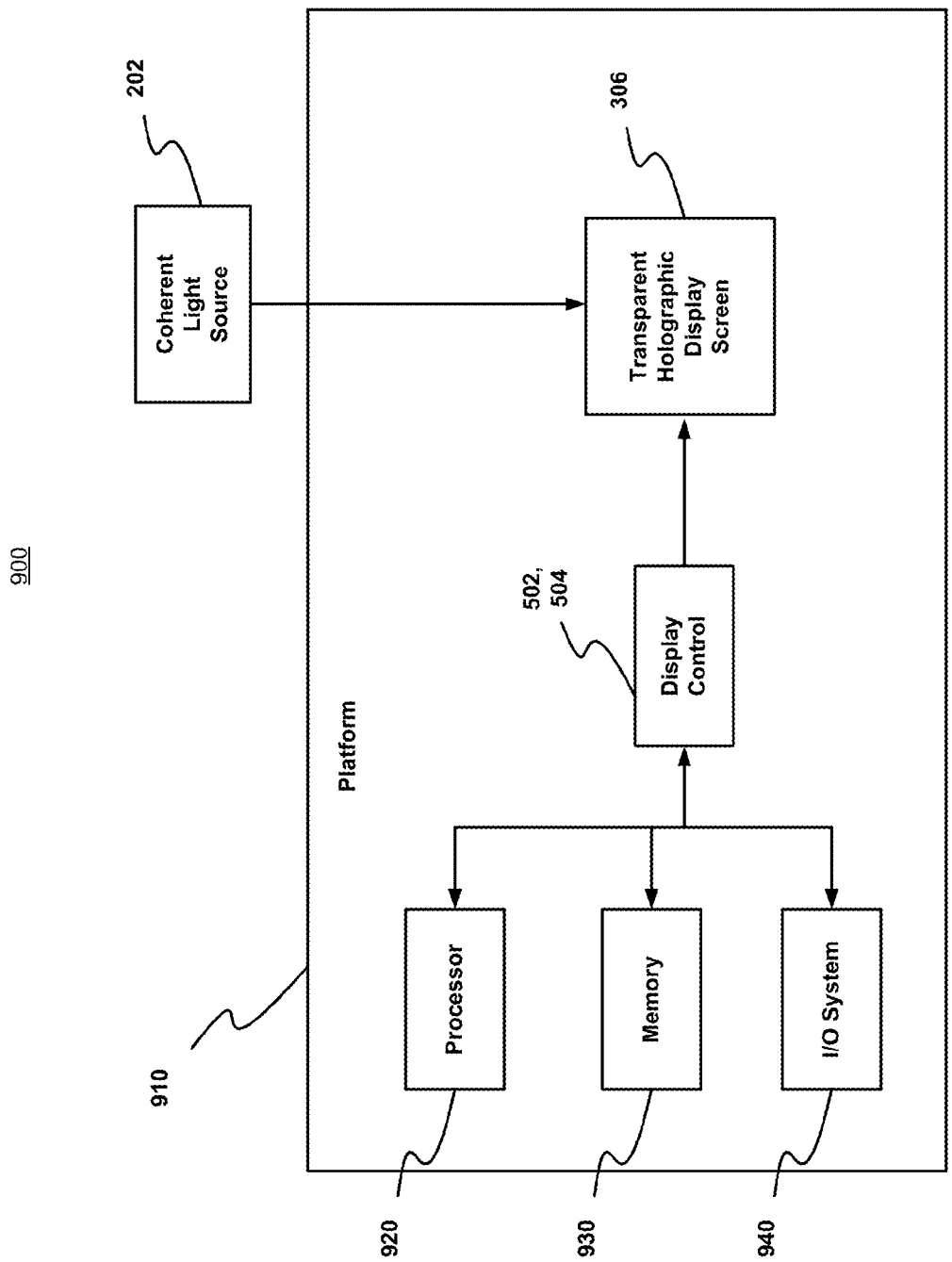
FIG. 9 illustrates a system diagram of a platform of one exemplary embodiment consistent with the present disclosure.

FIG. 9 illustrates a system diagram 900 of a platform of one exemplary embodiment consistent with the present disclosure. Platform 910 may be a computer workstation, an entertainment display device, a mobile device, such as, for example, a smartphone, a tablet, a laptop computer or any other device configured to display images and/or videos. Platform 910 may include a processor 920, memory 930, an input/output (I/O) system 940, a display controller 502, 504, and a transparent holographic display screen 306. A coherent light source 202 may be provided as an element that is integrated with or external to the platform. In some embodiments, coherent light source 202 may be worn by, or otherwise mounted or attached, to a user or user's clothing. In some embodiments, coherent light source 202 may be attached to or mounted on a desktop stand of any suitable type or it may be attached to the platform.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides a system, method and platform for generating three dimensional holographic images on a transparent display screen with dynamic image control.

The system may include a transparent display screen including an array of pixels. The system of this example may also include a driver circuit configured to control each of the pixels in the array of pixels such that the transparent display screen displays an interference fringe pattern, the interference fringe pattern associated with a hologram. The system of this example may further include a coherent light source configured to illuminate the transparent display screen with coherent light, transformation of the coherent light by the interference fringe pattern generates a three dimensional holographic image.

Another example system includes the forgoing components and further includes an interference pattern reconstruction module configured to generate the interference fringe pattern based on interference pattern features.

Another example system includes the forgoing components and the interference pattern features include a period and a direction associated with each of a plurality of segments of interference pattern stripes.

Another example system includes the forgoing components and the transformation includes variation in phase of the coherent light.

Another example system includes the forgoing components and the transformation includes variation in transmittance of the coherent light.

Another example system includes the forgoing components and the array of pixels includes a first array of electrodes disposed on a front layer of the transparent display screen, a second array of electrodes disposed on a rear layer of the transparent display screen and an interior layer located between the front layer and the rear layer.

Another example system includes the forgoing components and the driver circuit is further configured to control each of the pixels by applying a voltage differential between a first electrode in the first array and a corresponding second electrode in the second array, the first and second electrodes associated with the pixel.

Another example system includes the forgoing components and the electrodes are included of a transparent conducting crystal.

Another example system includes the forgoing components and the transparent conducting crystal is Indium Tin Oxide or Graphene.

Another example system includes the forgoing components and the interior layer is a liquid crystal, LiNbO3 or BaB2O4.

Another example system includes the forgoing components and the pixels are configured to a size in the range of 400 to 750 nanometers.

According to another aspect there is provided a method. The method may include displaying an interference fringe pattern on a transparent display screen including an array of pixels, the interference fringe pattern associated with a hologram. The method of this example may also include illuminating the transparent display screen with coherent light such that transformation of the coherent light by the interference fringe pattern generates a three dimensional holographic image.

Another example method includes the forgoing operations and further includes generating the interference fringe pattern based on interference pattern features.

Another example method includes the forgoing operations and the interference pattern features include a period and a direction associated with each of a plurality of segments of interference pattern stripes.

Another example method includes the forgoing operations and the transformation includes variation in phase of the coherent light.

Another example method includes the forgoing operations and the transformation includes variation in transmittance of the coherent light.

Another example method includes the forgoing operations and further includes configuring the screen as a first array of electrodes disposed on a front layer of the transparent display screen, a second array of electrodes disposed on a rear layer of the transparent display screen and an interior layer located between the front layer and the rear layer.

Another example method includes the forgoing operations and further includes controlling each of the pixels by applying a voltage differential between a first electrode in the first array and a corresponding second electrode in the second array, the first and second electrodes associated with the pixel.

According to another aspect there is provided a platform. The platform may include a processor, a memory coupled to the processor and an I/O system coupled to the processor. The platform of this example may also include a transparent display screen coupled to the I/O system, the transparent display screen including an array of pixels. The platform of this example may further include a driver circuit configured to control each of the pixels in the array of pixels such that the transparent display screen displays an interference fringe pattern, the interference fringe pattern associated with a hologram. The platform of this example may further include a coherent light source configured to illuminate the transparent display screen with coherent light, transformation of the coherent light by the interference fringe pattern generates a three dimensional holographic image.

Another example platform includes the forgoing components and the platform is a smartphone, a laptop computing device, a tablet or a workstation computing device.

Another example platform includes the forgoing components and the coherent light source is coupled to the platform and is configured for adjustable positioning to illuminate the transparent display screen.

Another example platform includes the forgoing components and the coherent light source is provided by a user of the platform.

Another example platform includes the forgoing components and further includes an interference pattern reconstruction module configured to generate the interference fringe pattern based on interference pattern features.

Another example platform includes the forgoing components and the interference pattern features include a period and a direction associated with each of a plurality of segments of interference pattern stripes.

Another example platform includes the forgoing components and the array of pixels includes a first array of electrodes disposed on a front layer of the transparent display screen, a second array of electrodes disposed on a rear layer of the transparent display screen and an interior layer located between the front layer and the rear layer.

Another example platform includes the forgoing components and the driver circuit is further configured to control each of the pixels by applying a voltage differential between a first electrode in the first array and a corresponding second electrode in the second array, the first and second electrodes associated with the pixel.

Another example platform includes the forgoing components and the electrodes are included of a transparent conducting crystal.

Another example platform includes the forgoing components and the transparent conducting crystal is Indium Tin Oxide or Graphene.

Another example platform includes the forgoing components and the interior layer is a liquid crystal, LiNbO3 or BaB2O4.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for generating a holographic image, said system comprising:
    a transparent display screen comprising an array of pixels;
    an interference pattern reconstruction module to generate an interference fringe pattern from an approximation of said interference fringe pattern stored in a memory of the system, the approximation comprising an estimate of a direction and a period of segments of stripes within regions of the interference fringe pattern, the interference fringe pattern associated with a hologram;
    a driver circuit configured to control each of said pixels in said array of pixels such that said transparent display screen displays the interference fringe pattern; and
    a coherent light source configured to illuminate said transparent display screen with coherent light, wherein transformation of said coherent light by said interference fringe pattern generates a three dimensional holographic image.

2. The system of claim 1, wherein the interference pattern reconstruction module is further configured to adjust a number or spatial extent of said regions to achieve a desired image quality.

3. The system of claim 1, wherein said transformation comprises variation in phase of said coherent light.

4. The system of claim 1, wherein said transformation comprises variation in transmittance of said coherent light.

5. The system of claim 1, wherein said array of pixels comprises a first array of electrodes disposed on a front surface of said transparent display screen, a second array of electrodes disposed on a rear surface of said transparent display screen and an interior layer located between said first and second arrays.

6. The system of claim 5, wherein said driver circuit is further configured to control each of said pixels by applying a voltage differential between a first electrode in said first array and a corresponding second electrode in said second array, said first and second electrodes associated with said pixel.

7. The system of claim 5, wherein said electrodes are comprised of a transparent conducting material.

8. The system of claim 7, wherein said transparent conducting material is selected from the group consisting of Indium Tin Oxide and Graphene and said interior layer is selected from the group consisting of a liquid crystal, $LiNbO_3$ and $BaB_2O_4$.

9. The system of claim 1, wherein said pixels are configured to a size in the range of 400 to 750 nanometers.

10. The system of claim 1, wherein said approximation consists of said estimate of a direction and a period of segments of stripes within regions of the interference fringe pattern.

11. A method for generating a holographic image, said method comprising:
  generating an interference fringe pattern from a an approximation of said interference fringe pattern, the approximation comprising an estimate of a direction and a period of segments of stripes within regions of the interference fringe pattern, the interference fringe pattern associated with a hologram;
  displaying the interference fringe pattern with a transparent display screen comprising an array of pixels; and
  illuminating said transparent display screen with coherent light such that transformation of said coherent light by said interference fringe pattern generates a three dimensional holographic image.

12. The method of claim 11, further comprising adjusting a number or spatial extent of said regions to achieve a desired image quality.

13. The method of claim 11, wherein said transformation comprises variation in phase of said coherent light.

14. The method of claim 11, wherein said transformation comprises variation in transmittance of said coherent light.

15. The method of claim 11, wherein said transparent display screen comprises a first array of electrodes disposed on a front surface of said transparent display screen, a second array of electrodes disposed on a rear surface of said transparent display screen, and an interior layer located between said first array and said second arrays.

16. The method of claim 15, further comprising controlling each of said pixels by applying a voltage differential between a first electrode in said first array and a corresponding second electrode in said second array, said first and second electrodes associated with said pixel.

17. A platform comprising:
  a processor;
  a memory coupled to said processor;
  an input/output (I/O) system coupled to said processor;
  a transparent display screen coupled to said I/O system, said transparent display screen comprising an array of pixels;
  an interference pattern reconstruction module to generate an interference fringe pattern from an approximation of said interference fringe pattern stored in a memory of the system, the approximation comprising an estimate of a direction and a period of segments of segments of stripes within regions of the interference fringe pattern, the interference fringe pattern associated with a hologram;
  a driver circuit configured to control each of said pixels in said array of pixels such that said transparent display screen displays said interference fringe pattern; and
  a coherent light source configured to illuminate said transparent display screen with coherent light, wherein transformation of said coherent light by said interference fringe pattern generates a three dimensional holographic image.

18. The platform of claim 17, wherein said platform is selected from the group consisting of a smartphone, a laptop computing device, a tablet and a workstation computing device.

19. The platform of claim 17, wherein said coherent light source is coupled to said platform and is configured for adjustable positioning to illuminate said transparent display screen.

20. The platform of claim 17, wherein said coherent light source is provided by a user of said platform.

21. The platform of claim 17, wherein the interference pattern reconstruction module is further configured to adjust a number or spatial extent of said regions to achieve a desired image quality.

22. The platform of claim 17, wherein said array of pixels comprises a first array of electrodes disposed on a front surface of said transparent display screen, a second array of electrodes disposed on a rear surface of said transparent display screen and an interior layer located between said first and second arrays.

23. The platform of claim 22, wherein said driver circuit is further configured to control each of said pixels by applying a voltage differential between a first electrode in said first array and a corresponding second electrode in said second array, said first and second electrodes associated with said pixel.

24. The platform of claim 22, wherein said electrodes are comprised of a transparent conducting material.

25. The platform of claim 24, wherein said transparent conducting material is selected from the group consisting of Indium Tin Oxide and Graphene and said interior layer is selected from the group consisting of a liquid crystal, $LiNbO_3$ and $BaB_2O_4$.

26. The platform of claim 17, wherein said approximation consists of said estimate of a direction and a period of segments of stripes within regions of the interference fringe pattern.

* * * * *